United States Patent Office 3,007,831
Patented Nov. 7, 1961

3,007,831
PROCESS FOR BONDING URETHANE POLYMERS TO RUBBER AND ADHESIVE THEREFOR
Vincent J. Keenan, Ardmore, Pa., assignor to The Atlantic Refining Company, Philadelphia, Pa., a corporation of Pennsylvania
No Drawing. Filed Sept. 3, 1958, Ser. No. 758,689
16 Claims. (Cl. 156—52)

This invention relates to novel adhesives and to their use in bonding urethane polymers to other synthetic or natural rubbers. More particularly this invention relates to novel polyisocyanate adhesives and to a method for bonding a urethane polymer to other synthetic or natural rubbers using these novel adhesives and to the novel products produced thereby.

As used in this specification and appended claims the following definitions of certain words and phrases are necessary to the complete comprehension of this invention.

"Rubber" and related terms include both natural and synthetic rubbers.

"Urethane polymers" and related terms include compounds prepared by condensing a polyisocyanate with a polyalkylene glycol such as polyethylene glycol or polyester.

Natural and synthetic rubbers have many properties which make them commercially valuable. The resiliency, elasticity and other mechanical properties are such that natural and synthetic rubbers have been used in a variety of rubber products. In recent years synthetic rubbers have been increasingly replacing the use of natural rubber in many products, for example, automobile tires and tubes.

Rubbers can be compounded to have the required strength and mechanical properties necessary for their use in rubber products such as tires and tubes. However, many natural and synthetic rubbers when compounded into ultimate commercial products are limited in the properties of abrasion and/or wear resistance.

Urethane polymers which are a class of synthetic rubbers possess certain unique properties which make them extremely desirable in compounding certain commercial rubber products. Specifically, urethane rubbers have outstanding abrasion and wear resistant properties; however, urethane rubbers are relatively expensive when compounded into commercial products as compared with natural or synthetic rubber products.

The unique feature of wear resistance possessed by urethane rubbers is of special importance to automobile tire manufacturers, but because of cost considerations it is impractical to prepare a tire exclusively of urethane rubber. It would be highly desirable, however, to be able to combine the inexpensive and readily available synthetic rubbers such as GR–S with an abrasion resistant urethane rubber in the preparation of an automobile tire. Such a tire conceivably would be compounded with a GR–S or similar tire stock capped with a wear resistant urethane rubber tread. This type of product has not been marketed commercially to date for several reasons, primarily because no one has been able to form and maintain a high strength cured bond between a natural or synthetic rubber and a urethane polymer. According to a recent (1957) publication, it is stated that cements are required to bond a natural or synthetic rubber to a urethane polymer. Cements of many varieties have been tried with essentially no success. Even adhesives based on commercial toluene diisocyanates have been unsuccessful. Recent experimental work has shown that alkyl benzene diisocyanates with alkyl chains containing up to four carbon atoms have also been unsuccessful in bonding natural or synthetic rubbers to urethane polymers.

It is, therefore, an object of this invention to provide a novel method for bonding urethane polymers to rubber.

It is another object of this invention to provide a method for forming a novel urethane polymer-rubber composition wherein the urethane polymer has formed a cured bond with the rubber.

It is a further object of this invention to provide novel adhesive compositions.

Other objects will become apparent as the description of this invention proceeds.

In accordance with one aspect of this invention a urethane polymer is bonded to a rubber through the use of novel adhesives prepared from polyisocyanates, particularly alkyl benzene diisocyanates in which the alkyl group contains more than four carbon atoms and is either straight or branched in structure.

Adhesives prepared from alkyl benzene diisocyanates in which the alkyl group contains four carbon atoms or less are well known. Particularly familiar are adhesives prepared from toluene diisocyanates. These adhesives, as stated above, have been tried as bonding agents to bond a urethane polymer to a rubber, however, all attempts to form such a cured bond have been unsuccessful.

The adhesives of this invention, however, produce a bond between a urethane polymer and a rubber that is stronger than the cohesive strength of the urethane polymer and the rubber, and as a result, an attempt to separate the urethane polymer-rubber composition will rupture the rubber or the urethane polymer prior to a separation at the bond.

These adhesives are prepared by reacting a polyalkylene glycol with an alkyl benzene diisocyanate. These alkyl benzene diisocyanates may be prepared by the method disclosed in copending application Serial No. 713,544, filed February 6, 1958. In this copending application these alkyl benzene diisocyanates were prepared from the corresponding dinitro alkyl benzenes by first reducing the dinitro compound to the corresponding diamine by either a catalytic hydrogenation step or a liquid phase reduction reaction. The diamine was then dissolved in a solvent such as ethyl acetate and reacted with an excess of phosgene to convert the carbamyl chlorides to the diisocyanates which were further purified by vacuum distillation.

As stated above, these alkyl benzene diisocyanates containing more than four carbon atoms are reacted with a polyalkylene glycol such as Carbowax 400 (a polyethylene glycol having an average molecular weight ranging between 380 and 420) to form the adhesives. More specifically, about 2 moles of an alkyl benzene diisocyanate in which the alkyl radical contains more than four carbon atoms is admixed with about one mole of a polyalkylene glycol and after an induction period of about ten minutes an exothermic reaction occurs which lasts for approximately thirty minutes. After the exotherm subsides, the reaction mass is heated for approximately thirty minutes at a temperature of from about 80° C. to about 120° C. This heating step is included to insure completeness of reaction. Tributyl amine (2.5 percent by weight of the reaction mass) is then added as an accelerator and the entire adhesive mixture is diluted with an organic solvent such as benzene, hexane, acetone, ethyl acetate, etc. to form a solution containing approximately 50 percent by weight of the adhesive.

Rubbers which may be bonded to urethane polymers by the process of this invention include natural and synthetic rubbers such as GR–S (an emulsion copolymer of butadiene and styrene), nitrile rubbers (emulsion copolymers of butadiene and acrylonitrile), butyl rubber (copolymers of isobutylene and isoprene), thiokols (polymers prepared by treating sodium polysulfide with dihalogenated materials, etc.

When natural or synthetic rubbers are used they may be compounded with ingredients customarily incorporated therewith for curing, filling, pigmenting, etc.

In one method of forming a novel bonded product of this invention either the solid urethane or the rubber component or both are coated with the above described adhesive. The adhesive is preferably applied in a solution in a volatile organic solvent which solvent is then allowed to evaporate. This coating may be effected in any convenient manner, such as brushing, spreading, spraying or dipping. After the evaporation of the organic solvent, the coated surfaces are compressed together and held together during a curing period while under heat and pressure. Under these conditions an extremely firm bond is obtained between the rubber and the solid urethane polymer.

The amount of solid adhesive necessary to form the strong bond between the rubber and urethane polymer product may vary widely. It has been found that a quantity of adhesive ranging from about 1.1 to about 11 grams per square foot of rubber surface will produce a satisfactory bond. However, it is preferred that an amount of solid adhesive ranging between about 3.8 to about 5.2 grams per square foot of rubber surface be employed for reasons of economy and strength of bond.

Temperatures and pressures used to cure the adhesive and vulcanize the rubber stock and thus form a strong bond are of the order of 120° C. to about 220° C. and about 1000 p.s.i.g. to about 5000 p.s.i.g. respectively. The preferred range, however, being from about 140° C. to about 170° C. and 1500 p.s.i.g. to about 3000 p.s.i.g. respectively.

Organic solvents which are to be used in applying the adhesive to the rubber and the urethane polymer must have the property of dissolving the adhesive, but not reacting therewith, nor should the solvent appreciably dissolve either the rubber or the urethane polymer. Suitable solvents have been found to be aromatic hydrocarbons, paraffinic hydrocarbons, esters, ketones, etc. Satisfactory adhesive solutions have been prepared in which the total active adhesive content of the solution is from about 35 percent by weight to about 75 percent by weight. A preferred and more practical solution from which the adhesive is applied to the rubber and/or urethane polymer is one in which the active adhesive content ranges from about 45 percent by weight to about 55 percent by weight.

In an alternative method of performing the process of this invention an uncured urethane polymer (which is an extremely viscous liquid rather than a solid) is applied in a mold to the rubber component which has previously been coated with the adhesive and the entire mass is then cured under the above described conditions of heat and pressure.

The preferred product resulting from the process of this invention is a compounded GR–S rubber bonded to a urethane polymer.

A typical unvulcanized but compounded GR–S rubber is as follows:

| | Parts by weight |
|---|---|
| GR–S rubber | 100 |
| Carbon black | 40 |
| Zinc oxide | 5 |
| Sulfur | 2 |
| 2-mercaptobenzothiazole | 1 |
| Tetramethylthiuram sulfide | 1 |
| Stearic acid | 1 |

It has been stated above that the novel adhesives of this invention may be prepared from alkyl benzene diisocyanates in which the alkyl chain possesses more than four carbon atoms and which alkyl chain may be either straight or branched in structure. The most preferred alkyl benzene diisocyanate to be used in preparing the novel adhesives of the invention are those in which the alkyl group contains from five to fifteen carbon atoms and particularly amyl benzene diisocyanate, hexyl benzene diisocyanate and dodecylbenzene diisocyanate.

The following examples are intended as illustrative of this invention and are not to be considered as limitative.

EXAMPLE I

A toluene diisocyanate-polyethylene glycol adhesive was prepared by admixing two moles of a toluene diisocyanate with one mole of a polyethylene glycol (Carbowax 400). After an induction period of about ten minutes an exothermic reaction occurred which lasted approximately thirty minutes. Upon the subsidence of the exotherm, the reaction mass was heated at a temperature of 100° C. for an additional thirty minutes. Tributylamine (2.5 percent by weight of the reaction mass) was then added and the entire mixture diluted with an amount of benzene sufficient to form a 50 percent by weight solution and the performance of the adhesive is presented and compared with other adhesives in Table I.

EXAMPLE II

A butyl benzene diisocyanate adhesive was prepared by admixing two moles of butyl benzene diisocyanate with one mole of a polyethylene glycol (Carbowax 400). After an induction period of about ten minutes an exothermic reaction occurred which lasted for approximately thirty minutes. Upon the subsidence of the exotherm the reaction mass was heated for approximately thirty minutes at a temperature of 115° C. Tributylamine (2.5 percent by weight of the reaction mass) was then added and the entire mixture diluted with an amount of ethyl acetate sufficient to form a 50 percent by weight solution. The performance of this adhesive is presented in Table I.

EXAMPLE III

An amyl benzene diisocyanate adhesive was prepared by admixing two moles of amyl benzene diisocyanate with one mole of a polyethylene glycol (Carbowax 400). After an induction period of about ten minutes, an exothermic reaction occurred which lasted for approximately thirty minutes. Upon the subsidence of the exotherm the reaction mass was heated for approximately thirty minutes at a temperature of 105° C. Tributylamine (2.5 percent by weight of the reaction mass) was then added and the entire mixture diluted with an amount of ethyl acetate sufficient to form a 50 percent by weight solution. The performance of this adhesive is presented in Table I.

EXAMPLE IV

A dodecyl benzene diisocyanate adhesive was prepared by admixing two moles of dodecyl benzene diisocyanate with one mole of a polyethylene glycol (Carbowax 400). After an induction period of about ten minutes, an exothermic reaction occurred which lasted for approximately thirty minutes. Upon the subsidence of the exotherm the reaction mass was heated for approximately thirty minutes at a temperature of 110° C. Tributylamine (2.5 percent by weight of the reaction mass) was added and the entire mixture diluted with an amount of ethyl acetate sufficient to form a 50 percent by weight solution. The performance of this adhesive is presented in Table I.

The adhesives prepared in Examples I to IV inclusive were tested for adhesive strength in accordance with ASTM D930–49 with the exception that the metal therein described was replaced by an equal sized piece of solid urethane polymers. The results of the tests of the adhesives prepared in Examples I to IV are presented in Table I below.

Table I

| Adhesive Tested | Peel Strength |
|---|---|
| Adhesive from Example I | None (Adhesive peels from GR–S). |
| Adhesive from Example II | None (Adhesive peels from GR–S). |
| Adhesive from Example III | 100 lb./in. (Adhesive joint remains intact, GR–S stock fails cohesively). |
| Adhesive from Example IV | 100 lb./in. (Adhesive joint remains intact, GR–S stock fails cohesively). |

It is clearly shown in the above table that no adhesion occurs between the rubber stock and the urethane polymer when using an adhesive prepared from either a toluene diisocyanate or a butyl benzene diisocyanate. Conversely, adhesives prepared from amyl benzene diisocyanate and dodecyl benzene diisocyanate produce bonds between a rubber stock and a urethane polymer which bonds are stronger than the rubber stock itself.

EXAMPLE V

A polyester was prepared according to the conventional method of reacting together 6 moles of adipic acid, 1.8 moles of propylene glycol, and 16.2 moles of ethyleneglycol. The resultant polyester was a waxy solid having a melting point of approximately 37° C. This polyester has a hydroxyl number of 86, a neutralization number of 0.42 and a molecular weight of 1300.

One mole of the above described polyester was then reacted with 1.68 moles of a toluene diisocyanate. The reaction mixture was then heated for thirty minutes at 130° C. and there was then added 0.54 moles of a diaminotoluene. The reaction mass was then cured for two hours at 150° C. and 2000 p.s.i. After curing there was obtained a solid rubbery product.

EXAMPLE VI

A 6″ x 6″ x ¼″ sample of the urethane polymer prepared as in Example V was contacted with a 6″ x 6″ x ¼″ sample of compounded but unvulcanized GR–S rubber under a pressure of 2000 p.s.i. and a temperature of 350° F. for one hour. At the end of this curing procedure it was observed that the urethane polymer and GR–S rubber were not bonded together and fell apart on inspection.

EXAMPLE VII

One mole of the polyester as prepared in Example V was mixed with 1.68 moles of toluene diisocyanate. The reaction mass was then heated for thirty minutes at 130° C. after which there was added 0.54 mole of diamino toluene. A sufficient amount of this mixture was placed in a 125 cc. mold measuring 6″ x 6″ x ¼″ and contacted with a 6″ x 6″ x ¼″ sample of compounded but unvulcanized GR–S rubber, and was heated at 300° F. for one-half hour under atmospheric pressure. Thereafter, the pressure was increased to 2000 p.s.i. and the mixture heated at 300° F. for an additional one-half hour. At the end of this curing operation the sample was cooled to room temperature and removed from the mold. It was observed that the original liquid portion of the sample had formed a rubbery urethane polymer, but there was no visible adhesion of the urethane polymer to the GR–S rubber.

It is clearly shown from Examples VI and VII that an adhesive is necessary to bond a urethane polymer to a rubber and that a cured bond cannot be formed between a liquid or solid urethane polymer and a natural or synthetic rubber without the use of adhesives.

I claim:

1. An adhesive material suitable for bonding a urethane polymer to an unsaturated rubber comprising the reaction product of polyethylene glycol and an alkyl benzene diisocyanate of the general formula

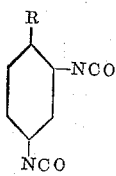

wherein R is an alkyl radical containing more than 4 carbon atoms and is selected from the group consisting of straight and branched chain radicals.

2. An adhesive material suitable for bonding a urethane polymer to an unsaturated rubber comprising the reaction product of polyethylene glycol and an alkyl benzene diisocyanate of the general formula

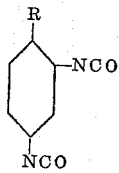

wherein R is an alkyl radical containing from about 5 carbon atoms to about 15 carbon atoms and is selected from the group consisting of straight and branched chain radicals.

3. An adhesive material suitable for bonding a urethane polymer to an unsaturated rubber comprising the reaction product of polyethylene glycol and an alkyl benzene-2,4-diisocyanate selected from the group consisting of amyl benzene-2,4-diisocyanate, hexylbenzene-2,4-diisocyanate, and dodecylbenzene-2,4-diisocyanate.

4. An adhesive material suitable for bonding a urethane polymer to an unsaturated rubber prepared by mixing about 1 mole of polyethylene glycol with about 2 moles of an alkylbenzene diisocyanate of the general formula

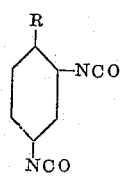

wherein R is an alkyl radical containing from about 5 carbon atoms to about 15 carbon atoms and is selected from the group consisting of straight and branched chain radicals, heating the resulting mixture for approximately 30 minutes at a temperature ranging from about 80° C. to 120° C., adding a minor amount of tributylamine, diluting the entire mixture with an organic solvent, and recovering an adhesive solution containing from about 35 percent by weight to about 75 percent by weight of adhesive.

5. An adhesive material suitable for bonding a urethane polymer to an unsaturated rubber prepared by mixing about 1 mole of polyethylene glycol with about 2 moles of an alkylbenzene diisocyanate of the general formula

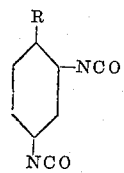

wherein R is an alkyl radical containing from about 5 carbon atoms to about 15 carbon atoms and is selected from the group consisting of straight and branched chain radicals, heating the resulting mixture for approximately 30 minutes at a temperature ranging between about 80° C. to 120° C., adding a minor amount of the tributylamine, diluting the entire mixture with an organic solvent selected from the group consisting of benzene, hexane, acetone, and ethyl acetate and recovering an adhesive solution containing approximately 45 percent by weight to 55 percent by weight of adhesive.

6. A method of bonding urethane polymers to an unsaturated rubber which comprises interposing between the urethane polymer and the unsaturated rubber an intermediate bonding phase comprising the reaction product of polyethylene glycol and an alkylbenzene diisocyanate of the general formula

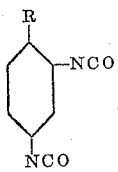

wherein R is an alkyl radical containing more than 4 carbon atoms and is selected from the group consisting of straight and branched chain radicals and heating the resulting structure under pressure.

7. A method of bonding urethane polymers to an unsaturated rubber which comprises interposing between the urethane polymer and the unsaturated rubber an intermediate bonding phase comprising the reaction product of polyethylene glycol and an alkylbenzene diisocyanate of the general formula

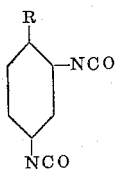

wherein R is an alkyl radical containing from about 5 carbon atoms to about 15 carbon atoms and is selected from the group consisting of straight and branched chain radicals and heating the resulting structure under pressure.

8. A method of bonding urethane polymers to an unsaturated rubber which comprises interposing between the urethane polymer and the unsaturated rubber an intermediate bonding phase in an amount ranging between about 1.1 to about 11.0 grams per square foot of rubber surface, comprising the reaction product of a polyethylene glycol and an alkylbenzene diisocyanate of the general formula

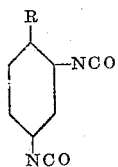

wherein R is an alkyl radical containing from about 5 carbon atoms to about 15 carbon atoms and is selected from the group consisting of straight and branched chain radicals, and heating the resulting structure under pressure.

9. A method of bonding urethane polymers to an unsaturated rubber which comprises interposing between the urethane polymer and the unsaturated rubber an intermediate bonding phase in an amount ranging between about 3.8 to about 5.2 grams per square foot of rubber surface, comprising the reaction product of a polyethylene glycol and an alkylbenzene diisocyanate of the general formula

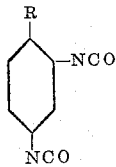

wherein R is an alkyl radical containing from about 5 carbon atoms to about 15 carbon atoms and is selected from the group consisting of straight and branched chain radicals, and heating the resulting structure under pressure.

10. A method of bonding urethane polymers to an unsaturated rubber which comprises interposing between the urethane polymer and the unsaturated rubber an intermediate bonding phase in an amount ranging between about 1.1 to about 11.0 grams per square foot of rubber surface, comprising the reaction product of a polyethylene glycol and an alkylbenzene diisocyanate of the general formula

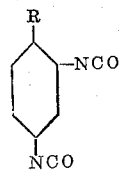

wherein R is an alkyl radical containing from about 5 carbon atoms to about 15 carbon atoms and is selected from the group consisting of straight and branched chain radicals, and heating the resulting structure at a temperature ranging between about 120° C. to about 220° C. under a pressure ranging between about 1000 p.s.i.g. to about 5000 p.s.i.g.

11. A method of bonding urethane polymers to an unsaturated rubber which comprises interposing between the urethane polymer and the unsaturated rubber an intermediate bonding phase in an amount ranging between about 3.8 to about 5.2 grams per square foot of rubber surface, comprising the reaction product of a polyethylene glycol and an alkylbenzene diisocyanate of the general formula

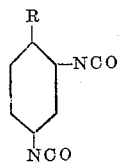

wherein R is an alkyl radical containing from about 5 carbon atoms to about 15 carbon atoms and is selected from the group consisting of straight and branched chain radicals, and heating the resulting structure at a temperature ranging between about 140° C. to about 170° C. under a pressure ranging between about 1500 p.s.i.g. to about 3000 p.s.i.g.

12. A method of bonding a urethane polymer to an unsaturated rubber which comprises interposing between the urethane polymer and the unsaturated rubber an intermediate bonding phase in an amount ranging between about 3.8 to about 5.2 grams per square foot of rubber surface, comprising the reaction product of a polyethylene glycol and an alkylbenzene-2,4-diisocyanate selected from the group consisting of amylbenzene-2,4-diisocyanate, hexylbenzene-2,4-diisocyanate and dodecylbenzene-2,4-diisocyanate and heating the resulting structure at a temperature ranging between about 140° C. to about 170° C. under a pressure ranging between about 1500 p.s.i.g. to about 3000 p.s.i.g.

13. A composite article comprising an unsaturated rubber bonded to a urethane polymer by means of an intermediate bonding phase comprising an adhesive prepared by reacting a polyethylene glycol with an alkylbenzene diisocyanate of the general formula

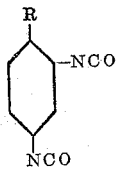

wherein R is an alkyl radical containing more than 4 carbon atoms and is selected from the group consisting of straight and branched chain radicals 14. A composite article comprising a body of unsaturated rubber bonded to a urethane polymer by means of an intermediate bonding phase comprising an amount of an adhesive ranging between about 1.1 to about 11.0 grams per square foot of rubber surface, and which adhesive is prepared by reacting polyethylene glycol with an alkylbenzene diisocyanate of the general formula

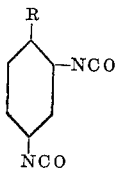

wherein R is an alkyl radical containing from about 5 carbon atoms to about 15 carbons atoms and is selected from the group consisting of straight and branched chain radicals.

15. A composite article comprising a body of unsaturated rubber bonded to a urethane polymer by means of an intermediate bonding phase comprising an amount of an adhesive ranging between about 3.8 to about 5.2 per square foot of rubber surface, and which adhesive is prepared by reacting polyethylene glycol with an alkylbenzene diisocyanate of the general formula

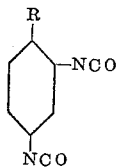

wherein R is an alkyl radical containing more than 4 carbon atoms and is selected from the group consisting of straight and branched chain radicals.

16. A composite article comprising a body of unsaturated rubber bonded to a urethane polymer by means of an intermediate bonding phase comprising an amount of an adhesive ranging between about 3.8 to about 5.2 grams per square foot of rubber surface, and which adhesive is prepared by reacting polyethylene glycol with an alkylbenzene-2,4-diisocyanate selected from the group consisting of amylbenzene-2,4-diisocyanate, hexylbenzene-2,4-diisocyanate, and dodecylbenzene-2,4-diisocyanate.

References Cited in the file of this patent

UNITED STATES PATENTS

| | | |
|---|---|---|
| 2,436,222 | Neal et al. | Feb. 17, 1948 |
| 2,650,212 | Windemuth | Aug. 25, 1953 |
| 2,671,082 | Stallman | Mar. 2, 1954 |
| 2,683,144 | Balon et al. | July 6, 1954 |
| 2,692,873 | Langerak et al. | Oct. 26, 1954 |
| 2,831,012 | Bernard | Apr. 15, 1958 |
| 2,858,296 | Stilmar | Oct. 28, 1958 |

FOREIGN PATENTS

| | | |
|---|---|---|
| 779,806 | Great Britain | July 24, 1957 |